United States Patent [19]

Touborg

[11] 3,980,486
[45] Sept. 14, 1976

[54] CALCINATION OF PULVEROUS MATERIAL

[75] Inventor: Jorn Touborg, Copenhagen Valby, Denmark

[73] Assignee: F. L. Smidth & Co., Cresskill, N.J.

[22] Filed: Mar. 12, 1974

[21] Appl. No.: 450,291

[30] Foreign Application Priority Data

Mar. 14, 1973 United Kingdom............... 12193/73

[52] U.S. Cl. .............................................. 106/100
[51] Int. Cl.$^2$ .......................................... C04B 7/44
[58] Field of Search .................................... 106/100

[56] References Cited
UNITED STATES PATENTS

| | | | |
|---|---|---|---|
| 2,874,950 | 2/1959 | Pyzel | 106/100 |
| 2,981,531 | 4/1961 | Pyzel | 106/100 |
| 3,022,989 | 2/1962 | Pyzel | 106/100 |

*Primary Examiner*—J. Poer
*Attorney, Agent, or Firm*—Pennie & Edmonds

[57] ABSTRACT

A method of heat treating a preheated, pulverous raw material consisting of or containing lime, such as cement raw meal. Preheated pulverous raw material is accumulated in a lower portion of a calcination chamber and a substantially incombustible gas is introduced into the accumulation at a sufficient velocity to traverse the accumulation to cause surface portions to overflow a weir. An oxygen-containing gas is introduced into a flame chamber overlying the accumulation. At least one flame is maintained within the flame chamber by burning a fuel therein. The heat necessary for at least partially calcining particles of raw materials suspended in the incombustible gas and oxygen-containing gas is transmitted from the flame to the suspension of raw materials. The treated materials may then be subjected to a finishing calcination and-/or any other final heat treatment. An improved calcination plant is disclosed for at least partially calcining a pulverous raw material according to the method of the present invention wherein the heat necessary for at least partially calcining the preheated fluidised raw material is supplied by at least one flame which is maintained in a flame chamber through the introduction of at least one burner pipe into the flame chamber of the plant.

24 Claims, 6 Drawing Figures

CALCINATION OF PULVEROUS MATERIAL

BACKGROUND OF THE INVENTION

1. FIELD OF THE INVENTION

This invention relates to calcination of preheated pulverous, raw material, such as cement raw meal, consisting of or containing lime. The invention relates to an improved method of at least partially calcining such pulverous, raw materials and improved calcination plants for treating such raw materials according to the improved method wherein heat is supplied directly by maintaining a flame in a flame chamber to effect at least a partial calcination before the material is subjected to any finishing calcination and/or other heat treatment, if any.

2. Description of the Prior Art

Calcination of pulverous raw materials such as cement raw meal is to be understood as an expulsion of carbon dioxide from calcium carbonate by an endothermic process (i.e. a process in which heat is absorbed) according to the equation:

$$CaCO_3 \rightarrow CaO + CO_2$$

When the raw material is cement raw meal, a finishing heat treatment following the calcination is a sintering by which cement clinker is produced. Sintering is an exothermic process characterized by, or formed with, evolution of heat.

The heat necessary for carrying through the conversion of cement raw meal to cement clinker is usually obtained by burning fuel which together with combustion air, is introduced into a combustion chamber in which the fuel burns successively with the combustion air and forms smoke gas. As a result, the energy contained in the fuel is released for heating the smoke gas to a high temperature. The hot smoke gas is then brought into contact with the raw meal to be heat treated, i.e. preheated, calcined and burned. The heat treatment usually takes place as a continuous process in a rotary kiln with slightly inclining axis. If so, the lower lying end of the rotary kiln is — as is usual for rotary kilns — designed as a combustion chamber.

However, in the manufacture of cement the trend is to carry through preheating and calcination of the raw meal separately by means of hot gas from one source of heat and sintering of the raw meal in a rotary kiln by means of hot gas from another source of heat, that is the flame of the rotary kiln. This is particularly due to the presence of alkalies in the raw meal.

As far as the calcination of cement raw meal is concerned relatively large quantities of materials have to be subjected to a relatively low heating. That is, the process takes place at a rather low temperature which is often inconsistent with the use of smoke gases of a high temperature for carrying through the calcination. There is a great risk of excessively heating the raw meal locally and temporarily. Even a brief period of excessively heating a part of the raw meal may cause expulsion of alkali vapours or produce melts which may involve caking problems. Furthermore, excessive heating of the raw meal at the calcination stage may prevent chemical reactions intended for a later stage of the whole process of manufacturing cement clinker. For example, the formation of clinker minerals at such stage of the whole heat treatment process at which calcination is to take place involves an unfavorable and disadvantageous development of the whole process.

U.S. Pat. No. 3,203,681 to Rosa, et al. relates to a process wherein heat for carrying through the calcination of preheated cement raw meal derives from hot gases having a temperature higher than the calcination temperature. The gases are produced in a separate chamber and are passed upwardly in a riser column in which the raw material is suspended and entrained by the gases thus produced. British Patent No. 960,863 to Fritzsche relates to a process for the calcination of raw silicate material in a fluidised state and the pre-heating, calcination, and sintering, or melting steps, of the heat treatment are effected as separate successive operations in a cyclone pre-heater, a fluidised layer and a combustion chamber respectively. However neither of these patents disclose or suggest a method of heat treating a pulverous, raw material or a plant for practicing the method such as I have invented as will develop in the following description. According to my invention, a raw material consisting entirely of, or at least containing a portion of, lime is at least partially calcined substantially isothermically (i.e. constant temperature conditions) at relatively low temperatures by supplying the heat for carrying out the calcination or partial calcination at the place where the raw materials are present, suspended in a gas, and maintained in a fluidised accumulation.

SUMMARY OF THE INVENTION

According to the method of the present invention a preheated, pulverous raw material consisting of, or at least containing a portion of, lime is at least partially calcined. The method comprises accumulating a quantity of the preheated pulverous raw material in a lower portion of a calcination chamber and introducing a substantially incombustible gas in a manner to traverse the accumulation of the raw material from below and at sufficient velocity to fluidise the pulverous raw material and mix the gas with portions of the raw material to cause surface portions thereof to overflow a weir. The gas at least partially continuously entrains particles of the raw material from the accumulation and carries them in suspension to a flame chamber defined by a space overlying the accumulation. The method further comprises introducing into the overlying space an oxygen-containing gas entraining the mixture of gas and raw materials overflowing the weir and maintaining at least one flame in the overlying space by burning fuel with the oxygen-containing gas by supplying the gas to the flame such that the heat necessary for at least partially calcining the particles of raw materials suspended in the incombustible gas and oxygen-containing gas is transmitted from the flame to the suspension of raw material particles. The method further comprises suspending the particles thus treated in a conveying gas mixture to transport them away from the flame chamber. The conveying gas mixture is composed of combustion gases produced by the flame, carbon dioxide expelled from the particles of raw material by the calcination process, and of the incombustible fluidisation gas. The method further comprises separating the particles from the conveying gas mixture.

An essential feature of the process is thus that the flame supplying the heat for carrying out the calcination is formed at the place where the raw materials are present, suspended in a gas, and a fluidised accumulation of preheated raw material is maintained. The location of the raw materials being placed near the flame comprises a source for the suspension of raw material particles in gas.

When carried out in this way, the process ensures that the flame immediately comes into contact with a cloud of relatively cool particles of raw material is whirling suspension in a gas, by which the flame temperature is lowered so much that an efficient calcination is obtained at a desired low temperature, and approximately isothermally. In many cases the flame dwindles to almost nothing. The cloud of gas whirling preferably about horizontal axes with suspended particles of raw material protect the walls bounding the flame space against excessive heat from the flame or flames.

The use of the term "partial calcination" in the present context is due to the fact that the whole process of cement burning is often carried through in such a manner that only a partial calcination takes place at the calcination stage, whereas the finishing calcination is effected at the sintering stage. It is, of course, also conceivable that the preheated raw meal which is passed to the calcination stage has, in fact, already been subjected to a certain amount of calcination during the preheating stage.

The fuel for the calcination may be a gas, an oil or a solid, pulverous fuel, such as coal powder. In any event it is a gas is burning. For example, in the two last-mentioned cases, when a fuel is an oil, an oil vapour is burning, and when the fuel is a coal, a coal gas is burning, respectively.

A part of the fuel which by its combustion supplies heat for carrying out the calcination of the preheated material, may, instead of directly nourishing the flame or flames, be fed to and mixed with the fluidised accumulation of preheated pulverous raw material, and thus caused in a gaseous state together with the material to enter the space above the fluidised accumulation, where it is subsequently burnt. In this context it should be observed that in contrast it is known from my co-pending U.S. Patent application filed on Dec. 10, 1973 under Ser. No. 423,436 which derives its priority from British Patent Application No. 57071/72 dated Dec. 11, 1972 to mix the whole of the fuel with the fluidised accumulation of the preheated pulverous raw material.

In certain cases the process may advantageously be modified in that a part of the preheated pulverous material instead of being fed to the accumulation is suspended in the oxygen-containing gas and passed together with the oxygen-containing gas into the space where the fuel is burnt.

In cases where the raw materials, having been at least partially calcined, are subjected to a finishing calcination and/or other heat treatment, the incombustible gas which is used for fluidising the accumulation of raw material may be constituted by a part of the waste gases from the finishing calcination and/or other heat treatment. This supplementary heat treatment of the raw material is often succeeded by a cooling of the final product by causing a moving layer thereof to be swept and/or traversed by cooling air in a cooler of known type, such as a grate cooler, a separate planetary cooler, or an underlying rotating drum cooler. The oxygen-containing gas is preferably preheated to a temperature below the calcination temperature of the raw material and at least part of the used cooling air from the aforementioned cooling process may thus be used again in the oxygen-containing gas which is supplied to the flame or flames. The economy of the process is thus improved.

Preferably, the weir surrounds an upward flow of the oxygen-containing gas, which may then exercise a helical swirling action.

The invention also includes calcination apparatus for carrying out the new method, the plant comprising an upright shaft which provides a calcination chamber and the upper end of which is connected to a particle/gas separator and forms an exit for calcined raw material suspended in gas. A supply duct for oxygen-containing gas opening substantially centrally into the bottom of the calcination chamber, one or more burner pipes extending from below up through the supply duct and opening substantially level with the mouth of the supply duct, means for feeding fuel through the burner pipe or pipes for producing a flame in the calcination chamber at the mouth of each burner pipe, a support formed adjacent to the bottom of the calcination chamber for supporting a fluidised accumulation of pulverous, preheated raw material to a level determined by a weir separates the interior of the support from the flow of oxygen-containing gas from the supply pipe, means for feeding incombustible gas into the support from below to maintain the fluidised accumulation of material in the support and means for continuously feeding preheated, pulverous raw material to the support.

Preferably, the calcination chamber is of circular cross-section and the fluidised bed support takes the form of an annular groove formed in the bottom of the chamber and surrounding the mouth of the feeding duct for oxygen-containing gas, the mouth constituting the weir. In that case the supply duct may be arranged to cause the oxygen-containing gas to exercise a helical swirling action as it passes up through the calcination chamber.

In still another preferred embodiment four burne pipes are utilized such that four separate flames may be maintained in the flame chamber.

The invention also pertains to a plant for the production of cement clinker in which a calcination plant according to the invention is utilized in combination with a rotary kiln to produce cement clinker. In addition, the invention relates to cement raw meal which has been at least partially calcined by a method of heat treating such preheated raw materials.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
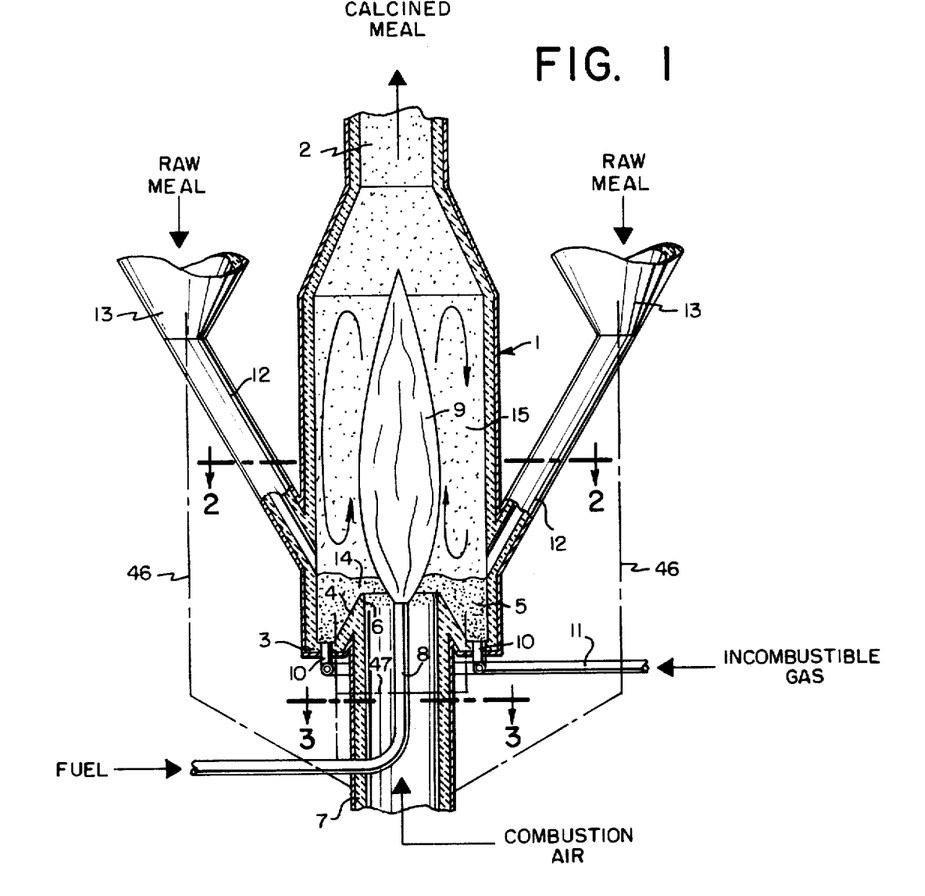
FIG. 1 is a vertical, substantially cross-sectional view of a plant for calcination of cement raw meal according to the invention.
Figure 2:
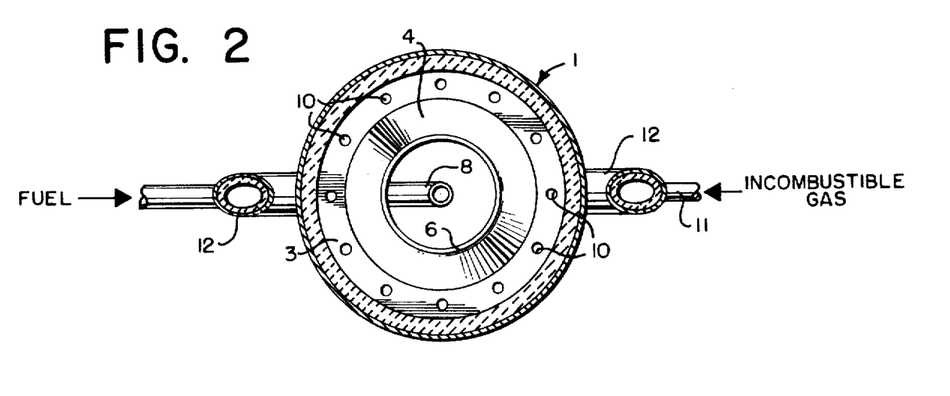
FIG. 2 is a horizontal cross sectional view taken along line 2—2 of FIG. 1.

The apparatus shown in FIGS. 1 and 2 has a shaft forming a calcination chamber 1 and provided with a fire-resistant lining. The shaft is cylindrical and of circular cross-section although other shapes are possible. It is restricted at its upper part so as to form a discharge pipe 2 for wholly or partly calcined particles of raw material. The pipe leads to a particle/gas separator such as a cyclone (not shown in FIGS. 1 and 2), into which it opens tangentially.

The chamber 1 has an annular bottom wall 3 and with a central upstanding frusto-conical wall 4 so as to form a support receptacle 5 which is open above and takes the form of an annular groove, defined by the bottom wall 3, by the wall of the shaft and by the wall 4. The upper edge of the wall 4 forms a weir 6 which at the same time constitutes the mouth of a vertical supply pipe 7 for combustion air introduced into the shaft 1 from below.

A burner pipe 8 for the supply of gaseous, liquid or solid pulverous fuel (for example coal powder) is introduced into the supply pipe 7 and passed centrally up to open almost on level with the weir 6, where the fuel forms a flame, nourished by the oxygen of combustion air fed through the supply pipe 7 when the plant is operating.

Supply pipes 10 for incombustible gas, for example atmospheric air under pressure and supplied through a pipe 11, open at the bottom of the receptacle 5. Beneath the shaft the pipe 11 is formed as an annular pipe connected to all the supply pipes 10, which are uniformly distributed around a circle, as shown in FIG. 2, or along two or more concentric circles. The incombustible gas supplied in finely divided streams fluidises the accumulation of preheated raw meal which is maintained in the receptacle 5 by a continual supply of fresh raw meal through one or more supply pipes 12. In FIGS. 1 and 2 two such supply pipes are illustrated and the raw meal for each of the two pipes 12 is fed continually each from its separate cyclone of which only part of the bottom 13 is indicated. Each of the two cyclones constitutes the lowermost cyclone in its separate string of a two-stringed conventional cyclone preheater (not shown) for preheating cement raw meal.

Though the preheated raw meal forms a fairly well defined surface 14, its aeration is nevertheless so powerful that raw meal almost in a foam-like state partly overflows the weir 6, from the receptacle 5, and partly is carried by the fluidisation gas into the space denoted 15 within the chamber 1 above the surface 14 as the air forces its way up through the surface 14. In similar manner the raw meal having overflown the weir 6 is entrained by the combustion air coming from the supply pipe 7. Both the raw meal entrained by the fluidisation gas and that entrained by the combustion air will thus for a time be present in the space 15, suspended in gas. However, in the gas eddies will be formed, mainly about horizontal axes, owing to the combustion air ascending from the central supply pipe 7. As a result nearly all the raw meal in the form of free-laid particles receives sooner or later sufficient heat from the flame 9 to enable a substantial part of the raw meal to be wholly calcined, and the balance of raw meal to be almost wholly calcined, at a low temperature and essentially isothermally.

The raw meal thus treated is removed from the top of the chamber 1 through the pipe 2, suspended in a gas mixture composed of combustion gas from the flame 9, carbon dioxide developed by calcination of the raw material particles, and fluidisation gas supplied from the pipes 10.

Figure 3:
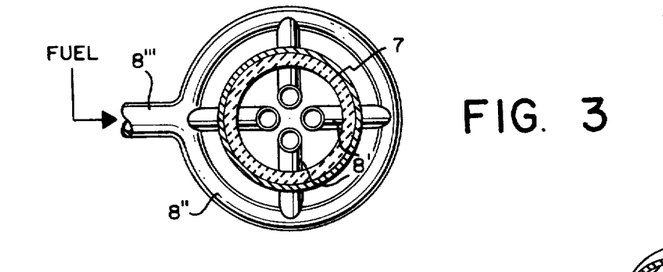
FIG. 3 is a horizontal cross sectional view taken along line 3—3 of FIG. 1, but illustrating a modification of the embodiment shown in FIG. 1.

FIG. 3 illustrates an outline of a detail of the calcination apparatus based upon the formation not only of one flame 9 but upon four such flames. In that case there is not one central burner pipe 8 but four such pipes denoted 8', distributed symmetrically in the supply pipe 7 and receiving the fuel which is then preferably gas or oil from an annular pipe 8'' fed from a common feeding pipe 8'''.

Figure 4:
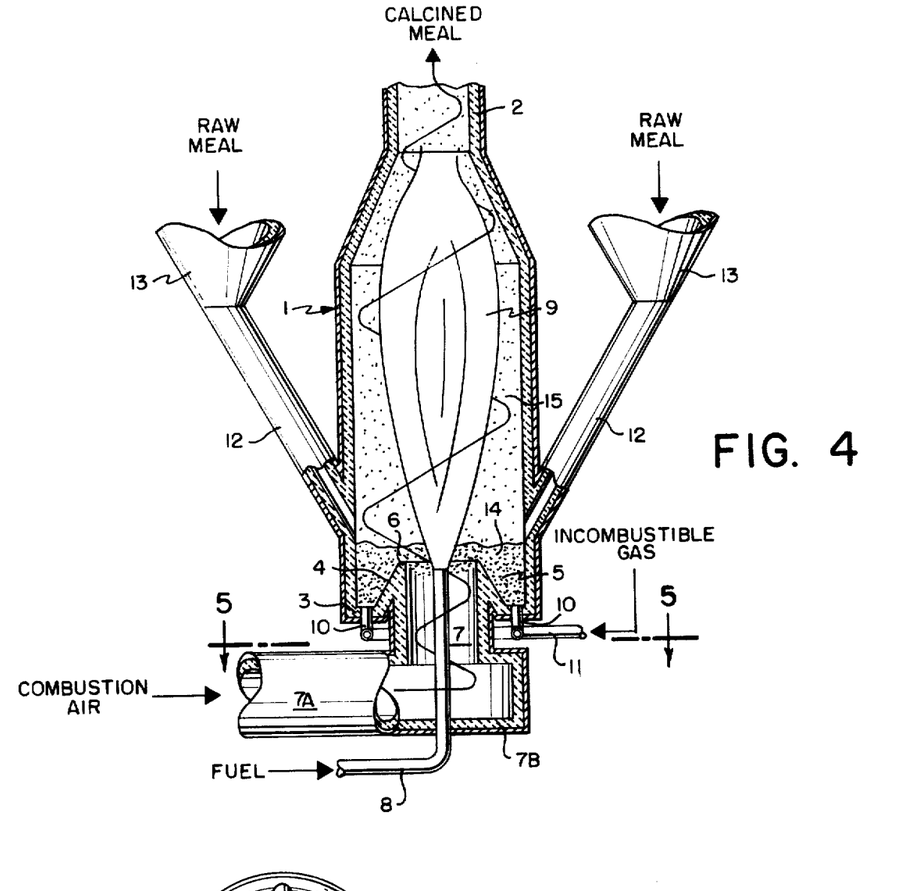
FIG. 4 is a vertical, substantially cross-sectional view of another modification of the embodiment shown in FIG. 1.
Figure 5:
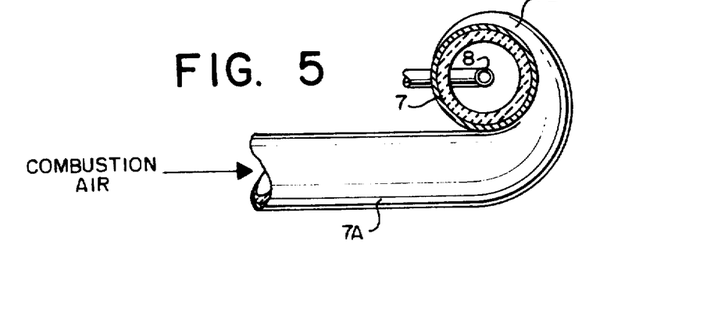
FIG. 5 is a horizontal, substantially cross-sectional view taken along line 5—5 of FIG. 4.

The modification illustrated in FIGS. 4 and 5 differs from the FIG. 1 example in that the combustion air supply pipe 7 is fed laterally through a branch 7A which leads into a vortex producing manifold 7B which in turn causes the air to exercise a helical swirling action as it passes up through the space 15 as indicated by the arrowed line.

In this case eddy currents like those indicated by the curves or arrows in the FIG. 1 example will not be formed, but the helical swirling motion of the gas will have the same effect as the eddies, although their common axis of rotation is vertical in this case instead of horizontal.

Figure 6:
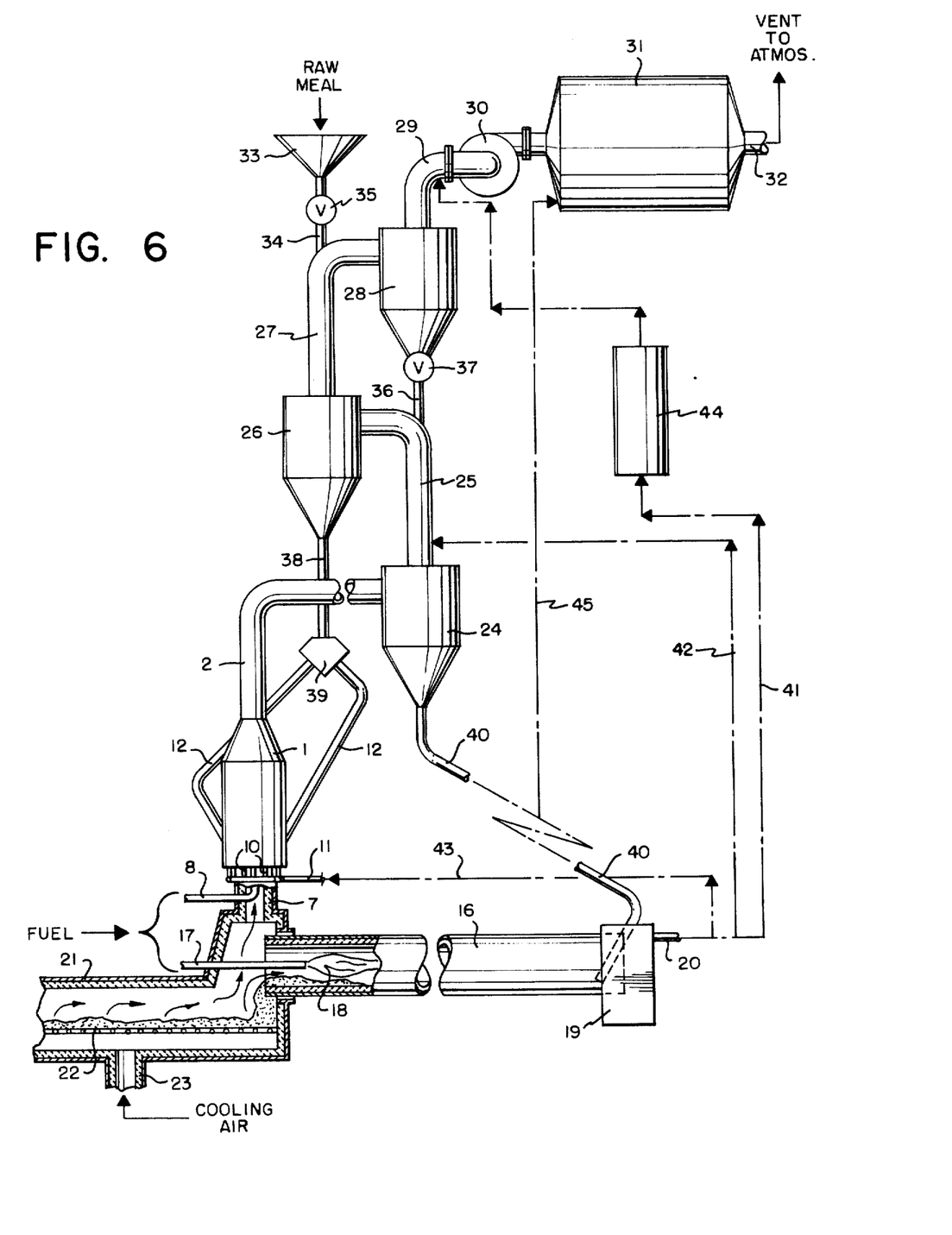
FIG. 6 is a diagrammatic representation of a complete cement burning plant incorporating by way of example, the calcination plant of FIG. 1, but which may incorporate any of the modifications of the plants shown in the other Figures.

FIG. 6 shows diagrammatically a plant for the manufacture of cement clinker on the basis of cold cement raw meal. In the installation the calcination plant shown in FIGS. 1 and 2 constitutes an integral part, although, by simple adaption the FIGS. 4 and 5 plant could equally well be incorporated. Parts shown in FIG. 4 that are common with those of FIGS. 1 and 2 are therefore provided with the same reference numerals. Thus, in FIG. 6 there is also the chamber 1 with the discharge pipe 2 and the supply pipes 7, 10, 11 and 12.

In addition there is a rotary kiln 16 in which the preheated and wholly or partially calcined raw meal after finished calcination, if any, is burnt to cement clinker. The heat for carrying through these kiln processes is obtained from gaseous, liquid or solid pulverous fuel fed to the interior of the kiln through a burner pipe 17 at the mouth of which there is formed a flame 18. The hot gases from the burner pipe 17 are passed through the slightly inclining kiln counter-currently to the calcined raw meal sliding down through the kiln in turbulence, swept by the kiln gases, by which burning of the raw meal to form cement clinker takes place. The smoke gases leave the kiln through a smoke chamber 19 surrounding the upper kiln end; and the smoke gases proceed through a smoke gas pipe 20.

Similarly the lower kiln end is surrounded by a casing 21, which also surrounds a cooler, in which the clinker leaving the kiln at a temperature of 1100° – 1200°C is cooled to about 100°C by the passage of atmospheric air, which is consequently heated and then utilized as preheated combustion air both in the rotary kiln 16 and in the chamber 1. The cooler consists of a grate 22, on which the clinker is distributed in a layer of suitable thickness. The layer of clinker then moves continuously away from the kiln, penetrated by transverse streams of cooling air supplied under pressure through a cooling air supply pipe 23 to the space below the grate 22. The extreme end of the cooler from which the cooled clinker is discharged is not shown in the Figure.

Having passed through the layer of clinker, the cooling air now preheated flows a-ong the paths indicated by arrows, partly into the rotary kiln 16, partly through the supply pipe 7, which is connected to the upper end of the casing 21, and into the chamber 1 as described in connection with FIG. 1.

With reference to FIG. 1 it was further mentioned that the discharge pipe 2 for calcined raw meal suspended in the waste gas from the calcination process was to be introduced tangentially into a cyclone. This is shown in FIG. 6 in which this cyclone is denoted 24. In this cyclone the calcined raw meal is separated from the waste gases and settles on the bottom of the cyclone, whilst the waste gases leave the cyclone through an upper central riser pipe 25.

The riser pipe 25 with a corresponding cyclone 26 and another riser pipe 27 with a corresponding cyclone 28 constitute a conventional two-stage cyclone preheater in which the cold raw meal is preheated by means of the waste gases from the calcination process before it is calcined itself.

From the top of the uppermost cyclone 28 of the cyclone preheater the waste gases are introduced through a central discharge pipe 29 into a fan 30 which produces the necessary sub-atmospheric pressure to cause the gas flow to take the path determined by the reference numerals 23, 21, 33, 7, 1 2, 24, 25, 26, 27, 28, 29 and 30. The delivery side of fan 30 opens into a dust precipitator 31 in which dust contained in the waste gases is removed so that they may escape through a vent pipe 32 into the atmospheric without causing damage.

The cold raw meal to be preheated, calcined and burnt to cement clinker is fed from a hopper 33 and sinks from the hopper into a feed pipe 34 which is fitted with a rotary gate valve 35 which prevents simultaneous intake of atmospheric air into the feed pipe 34. The other end of the pipe 34 opens into the lower end of the riser pipe 27 for the uppermost cyclone 28 of the cyclone preheater, which means that there is a sub-atmospheric pressure in the whole cyclone preheater, and also in the pipe 27, since the cyclone preheater is connected with the suction of the fan 30.

The raw meal fed is suspended in and heated by the hot gases ascending through the riser pipe 27 and is subsequently introduced into the cyclone 28, in which the preheated raw meal is separated off the sinks to the bottom of the cyclone, leaving the cyclone through a feed pipe 36 into which is inserted a rotary gate valve 37 serving the same purpose as the rotary gate valve 35. The raw meal is then introduced through the lower end of the riser pipe 25 into the lowermost preheater cyclone 26, suspended in the gases ascending through the riser pipe 25. In the cyclone 26 the further preheated raw meal and the gases are again separated, the gases following the path already described, whereas the raw meal sinks to the bottom of the cyclone 26 and hence into a feed pipe 38.

If the arrangement according to FIG. 6 had conformed fully to the plant shown in FIGS. 1 and 2 which foresees the use not of a single-string, but of a two-string cyclone preheater, there would have been two cyclones 26, one for each string and each having a separate feed pipe 38. The bottoms of the two cyclones and their feed pipes would then have conformed to the parts 13 and 12, respectively, of FIG. 1. Now according to FIG. 4 the use of a cyclone preheater with one string only is foreseen. In order nevertheless to have two feed pipes 12 passed to the receptacle 5 inside the shaft 1 so as to obtain a uniform distribution of preheated raw meal in the receptacle 5, the feed pipe 38 of the plant shown in FIG. 6 has been branched into two pipes, both denoted 12, since they correspond to the pipes referred to as branch pipes in FIG. 1. A uniform distribution of preheated raw meal to the two branch pipes 12 is effected by means of an adjustable damper located in a casing 39.

The raw meal calcined in the shaft 1 and separated from the gas in the cyclone 24 and the further passage of which has already been described is passed through a pipe 40 into the rotary kiln 16, in which the raw meal is converted to clinker as already described.

The heated solid particles of material contained in the exit gases of the rotary kiln leaving the kiln along the path through pipe 20 may be utilized in various manner depending on the path indicated by the dotted lines 41, 42, and 43 along which the kiln gas may be passed. Depending on the circumstances only one of the paths, two of them, or all three of them may be used.

If the kiln gases, or part thereof, flow as indicated by the dotted line 41, they unite with waste gases from the calcination of the raw meal in the shaft 1 directly before they are sucked into the fan 30 by which they are forced into the dust precipitator 31. Since the precipitator cannot withstand an excessive gas temperature, there is inserted a cooling tower 44 in the circuit as illustrated diagrammatically. In the cooling tower the gases are cooled by water. As a result the heat contained in the gases is lost unless the heat transmitted to the cooling water can be utilized. The solid particles, that is, dust contained in the waste gases, are, however, intercepted together with dust contained in the waste gases from calcination and preheating in the dust precipitator 31 and may, unless the dust contains an excessive amount of alkalis or chlorine, be fed to the rotary kiln 16, for example by being introduced into the pipe 40 as indicated by a dotted line 45.

If the smoke gases from the rotary kiln 16 or a part thereof follow the dotted line 42, they unite with the waste gases from the calcination of the raw meal effected in the chamber 1 and are introduced together with the latter gases into the cyclone preheater (25, 26, 27, 28, 29). In that case the heat contained in the rotary kiln gases is utilized as a contribution to preheat the raw meal and consequently to improve the economy of the process. The gases are cooled correspondingly and may therefore without damage pass with the waste gases from the calcination through the fan 30 into the dust precipitator 31, in which the total amount of dust is intercepted to be utilized if required as described in the foregoing.

If the smoke gases from the rotary kiln 16, or a part thereof, follow the dotted line 43, they are introduced in the pipe 11 instead of atmospheric air, and they will thus via the feed pipes 10 constitute the air that effects the fluidisation of the preheated raw meal in the receptacle 5 (see FIG. 1). As a result of the heat contained in the gas, the raw meal will be further heated while it is traversed by the gas from below. Solid particles contained in the gas mix with the other particles which are being suspended in the gas present in the shaft 1 in the space 15 above the receptacle 5 (see FIG. 1).

Reference has been made in the foregoing to alternative conveying paths in connection with FIG. 6, indicated by the dotted lines.

Also in FIG. 1 certain alternatives are illustrated. Thus, the dotted lines 46 indicate that a part of the preheated raw meal from the cyclones 13 instead of being passed with the remaining material to the receptacle 5 is introduced into the feed pipe 7 for combustion air, so as to be suspended therein and passed into the space 15.

Further dotted lines 47 suggest that a part of the fuel, instead of being fed directly to the flame 9 through burner pipe 8, may be branched off from the pipe and introduced into the bottom end of the receptacle 5 similarly as the fluidisation air is fed through the pipes 11 and 10. Unless the fuel is already in the gaseous state, it will be converted to gas or vapours (forming oil vapours or coal gas) when meeting the hot raw meal. The gas will ascend together with the fluidisation air through the accumulation of raw meal.

The plant shown in FIG. 6 should only be considered an example showing how it may be designed and many modifications may come in for consideration. Thus, it has already been suggested that the cyclone preheaters 25, 26, 27, 28, 29 may be one-stringed or two-stringed, but it may, for example also be four stringed as the preheater disclosed in commonly assigned U.S. application Ser. No. 310,999 which derives its priority from the corresponding British Patent Application No. 56051/71. If so, it will be natural to pass four feed pipes 12, staggered 90° in relation to one another, to the receptacle. Instead of two-stage preheaters, one-stage preheaters or four-stage preheaters may be used.

Furthermore a suspension preheater of a type different from that of the cyclone preheater may be used for preheating the raw meal, and also a clinker cooler other than the grate cooler 21, 22 and 23 may be used after the rotary kiln 16, for example an underlying independently rotating cooling drum or an independently rotating planetary cooler.

I claim:

1. A method of heat treating a pulverous raw material at least a portion of which is in the form of lime to produce at least a partial calcination thereof, comprising:
   a. preheating said pulverous raw material;
   b. accumulating a quantity of said preheated pulverous raw material in a lower portion of a calcination chamber defining a lower opening surrounded by a peripheral barrier;
   c. introducing a substantially incombustible gas upwardly into said calcination chamber in a manner to traverse the accumlation of said raw material from below and at sufficient velocity to fluidize the pulverous raw material and mix the gas with portions of the raw material while causing surface portions thereof to overflow said peripheral barrier, said incombustible gas further at least partially continuously entraining particles of said raw material from the accumulation and carrying them in suspension to a flame chamber defined by a space overlying said accumulation;
   d. introducing into said overlying space through said lower opening, an oxygen containing gas and a fuel to at least entrain the mixture of gas and raw materials overflowing said peripheral barrier;
   e. maintaining at least one flame in said overlying space by burning said fuel with said oxygen containing gas such that the heat necessary for at least partially calcining the particles of raw material suspended in the incombustible gas and oxygen containing gas is transmitted from said flame to the suspension of raw material particles;
   f. conveying said mixture of combustion gases produced by said flame, carbon dioxide developed by the raw material calcination, incombustible fluidization gas, and suspended raw material particles away from said flame chamber; and
   g. separating said at least partially calcined particles from said conveying gas mixture.

2. The method according to claim 1 further comprising:
   h. feeding at least a portion of the fuel to said fluidized accumulation of preheated raw material such that said fuel assumes a gaseous state and mixes with said fluidized accumulation of preheated raw material;
   i. causing the gaseous fuel and preheated raw material to enter said flame chamber defined by the overlying space; and
   j. burning said gaseous fuel and preheated raw material in said overlying space.

3. The method according to claim 1 further comprising suspending at least a portion of said preheated pulverous raw material in said oxygen-containing gas and passing said raw material and said oxygen-containing gas into said flame chamber defined by said overlying space where the burning step takes place.

4. The method according to claim 2 further comprising suspending at least a portion of said preheated pulverous raw material in said oxygen-containing gas and passing said raw material and said oxygen-containing gas into said flame chamber defined by said overlying space where the burning step takes place.

5. The method according to claim 1 further comprising: at least partially calcining said preheated raw material; subjecting the at least partially calcined raw material to at least one of a finishing calcination and sintering; and utilizing the waste gases from said finishing calcination or sintering as an incombustible gas for fluidizing the accumulation of preheated raw material in said partial calcining process.

6. The method according to claim 2 further comprising: at least partially calcining said preheated raw material; subjecting the at least partially calcined raw material to at least one of a finishing calcination and sintering; and utilizing the waste gases from said finishing calcination or sintering as an incombustible gas for fluidizing the accumulation of preheated raw material in said partial calcining process.

7. The method according to claim 3 further comprising: at least partially calcining said preheated raw material; subjecting the at least partially calcined raw material to at least one of a finishing calcination and sintering; and utilizing the waste gases from said finishing calcination or sintering as an incombustible gas for fluidizing the accumulation of preheated raw material in said partial calcining process.

8. The method according to claim 4 further comprising: at least partially calcining said preheated raw materials; subjecting the at least partially calcined raw material to at least one of a finishing calcination and sintering; and utilizing the waste gases from said finishing calcination or sintering as an incombustible gas for fluidizing the accumulation of preheated raw material in said partial calcining process.

9. The method according to claim 1 further comprising: at least partially calcining said preheated raw material; further subjecting the at least partially calcined raw material to at least one of a finishing calcination and sintering; subsequently directing atmospheric cooling air to said raw material for cooling; and redirecting at least a portion of the cooling air from said cooling process to said oxygen-containing gas for supplying said flame in said space overlying said accumulation of raw material.

10. The method according to claim 2 further comprising: at least partially calcining said preheated raw material; further subjecting the at least partially calcined raw material to at least one of a finishing calcination and sintering; subsequently directing atmospheric cooling air to said raw material for cooling; and redirecting at least a portion of the cooling air from said cooling process to said oxygen-containing gas for supplying said flame in said space overlying said accumulation of raw material.

11. The method according to claim 3 further comprising: at least partially calcining said preheated raw material, further subjecting the at least partially calcined raw material to at least one of a finishing calcination and sintering; subsequently directing atmospheric cooling air to said raw material for cooling; and redirecting at least a portion of the cooling air from said cooling process to said oxygen-containing gas for supplying said flame in said space overlying said accumulation of raw material.

12. The method according to claim 4 further comprising: at least partially calcining said preheated raw material; further subjecting the at least partially calcined raw material to at least one of a finishing calcination and sintering; subsequently directing atmospheric cooling air to said raw material for cooling; and redirecting at least a poriton of the cooling air from said cooling process to said oxygen-containing gas for supplying said flame in said space overlying said accumulation of raw material.

13. The method according to claim 5 further comprising: at least partially calcining said preheated raw material; further subjecting the at least partially calcined raw material to at least one of a finishing calcination and sintering; subsequently directing atmospheric cooling air to said raw material for cooling; and redirecting at least a portion of the cooling air from said cooling process to said oxygen-containing gas for supplying said flame in said space overlying said accumulation of raw material.

14. The method according to claim 6 further comprising: at least partially calcining said preheated raw material; further subjecting the at least partially calcined raw material to at least one of a finishing calcination and sintering; subsequently directing atmospheric cooling air to said raw material for cooling; and redirecting at least a portion of the cooling air from said cooling process to said oxygen-containing gas for supplying said flame in said space overlying said accumulation of raw material.

15. The method according to claim 7 further comprising: at least partially calcining said preheated raw material; further subjecting the at least partially calcined raw material to at least one of a finishing calcination and sintering; subsequently directing atmospheric cooling air to said raw material for cooling; and redirecting at least a portion of the cooling air from said cooling process to said oxygen-containing gas for supplying said flame in said space overlying said accumulation of raw material.

16. The method according to claim 8 further comprising: at least partially calcining said preheated raw material; further subjecting the at least partially calcined raw material to at least one of a finishing calcination and sintering; subsequently atmospheric atmosperic cooling air to said raw material for cooling; and redirecting at least a portion of the cooling air from said cooling process to said oxygen-containing gas for supplying said flame in said space overlying said accumulation of raw material.

17. The method according to claim 1 further comprising directing the upward flow of oxygen-containing gas in a helical swirling path toward said space overlying said accumulation of preheated raw material.

18. The method according to claim 5 further comprising directing the upward flow of oxygen-containing gas in a helical swirling path toward said space overlying said accumulation of preheated raw material.

19. The method according to claim 9 further comprising directing the upward flow of oxygen-containing gas in a helical swirling path toward said space overlying said accumulation of preheated raw material.

20. The method according to claim 10 further comprising directing the upward flow of oxygen-containing gas in a helical swirling path toward said space overlying said accumulation of preheated raw material.

21. The method according to claim 1 further comprising maintaining at least four flames in said overlying space defining said flame chamber.

22. A method of heat treating a pulverous cement raw material containing lime comprising:
  a. preheating said pulverous raw material;
  b. accumulating a quantity of said preheated pulverous raw material in a lower portion of a calcination chamber having a lower wall portion defining an opening surrounded by a peripheral barrier extending upwardly into said chamber from the lower wall portion to define a weir;
  c. introducing a substantially incombustible gas upwardly into said calcination chamber in a manner to traverse the accumulation of said raw material from below and at sufficient velocity to fluidize the pulverous raw material and substantially intensely mix the gas with portions of the raw material while causing surface portions thereof to overflow said weir, said incombustible gas further at least partially continuously entraining particles of said raw material from the accumulation and carrying them in suspension to a flame chamber defined by a space overlying said accumulation;
  d. introducing into said overlying space through said lower opening in said chamber, an oxygen-containing gas and a fuel in a manner causing said oxygen-containing gas to seize the mixture of gas and raw materials overflowing said weir;
  e. maintaining at least one flame in said overlying space by burning said fuel with said oxygen-containing gas by supplying said oxygen-containing gas to the flame such that the heat necessary for at least partially calcining the particles of raw material suspended in the incombustible gas and oxygen-containing gas is transmitted from said flame to the suspension of raw material particles;
  f. conveying said mixture of combustion gases produced by said flame, carbon dioxide developed by the raw material calcination, incombustible fluidization gas, and suspended raw material particles away from said flame chamber;

g. separating said at least partially calcined particles from said conveying gas mixture;

h. further subjecting the partially calcined raw materials to a finishing calcination and sintering;

i. subsequently directing atmospheric cooling air to said raw materials for cooling; and j. redirecting at least a portion of the atmospheric cooling air from said cooling process to said oxygen-containing gas for supplying said flame in said space overlying said accumulation of raw materials.

23. A method of heat treating a pulverous cement raw material containing lime comprising:

a. preheating said pulverous raw material in a multi-stage cyclone preheater;

b. directing a quantity of said preheated pulverous raw material to a calcination chamber;

c. accumulating a quantity of said preheated pulverous raw material in a lower portion of said calcination chamber, said lower portion of said chamber having a lower wall portion defining a substantially central opening surrounded by a peripheral barrier extending upwardly therefrom to define a weir thereby preventing at least a predetermined quantity of said raw material from flowing into said central opening;

d. introducing a substantially incombustible gas upwardly into said calcination chamber in a manner to traverse said raw material from below and at sufficient velocity to fluidize the pulverous raw material and mix the gas with portions of the raw material while causing surface portions thereof to overflow said weir, said incombustible gas further at least partially continuously entraining particles of said raw material from the accumulation and carrying them in suspension to a chamber defined by a space overlying said accumulation;

e. introducing into said overlying space through said lower opening in said lower wall portion, an oxygen-containing gas and a fuel, said oxygen containing gas having sufficient velocity to seize the mixture of gas and raw material overflowing said weir;

f. maintaining at least one flame in said overlying space by burning said fuel with said oxygen-containing gas to create a substantially continuous flame extending from a lower portion of the chamber through at least a portion of said overlying space such that the heat necessary for at least partially calcining, substantially isothermally, the particles of raw materials suspended in the incombustible gas and oxygen-containing gas, is substantially directly transmitted from said flame to said raw material particles due to the proximal contacting relation between said flame and said raw material particles;

g. conveying the mixture of the products of combustion of said flame and calcination process, incombustible fluidization gas, and suspended raw material particles away from said flame chamber; and h. separating said raw material particles from said conveying gas mixture prior to introducing the particles into a rotary kiln for further heat treatment.

24. A method of heat treating a pulverous raw material consisting entirely of lime to produce at least a partial calcination thereof, comprising:

a. preheating said pulverous raw material;

b. accumulating a quantity of said preheated pulverous raw material in a lower portion of a calcination chamber which defines an opening at a lower portion thereof surrounded by a peripheral barrier which extends upwardly into the chamber to define a peripheral weir;

c. introducing a substantially incombustible gas upwardly into said calcination chamber in a manner to traverse the accumulation of said raw material from below and at sufficient velocity to fluidize the pulverous raw material and mix the gas with portions of the raw material while causing surface portions thereof to overflow said weir, said incombustible gas further at least partially continuously entraining particles of said raw material from the accumulation and carrying them in suspension to a flame chamber defined by a space overlying said accumulation;

d. introducing into said overlying space through said lower opening in said chamber, an oxygen-containing gas and a fuel, said oxygen-containing gas at least entraining the mixture of gas and raw materials overflowing said peripheral barrier;

e. maintaining at least one flame in said overlying space by burning said fuel with said oxygen-containing gas by supplying said oxygen-containing gas to the flame such that the heat necessary for at least partially calcining the particles of raw materials susupended in the incombustible gas and oxygen-containing gas is transmitted from said flame to the suspension of raw material particles;

f. conveying said mixture of combustion gases produced by said flame, carbon dioxide developed by the raw material calcination, incombustible fluidization gas, and suspended raw material particles away from said flame chamber;

g. separating said at least partially calcined particles from said conveying gas mixture; and h. subjecting the partially calcined raw materials to a finishing calcination.

* * * * *